(12) United States Patent
Zimmer

(10) Patent No.: US 7,581,887 B2
(45) Date of Patent: Sep. 1, 2009

(54) WIPER BEARING

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 10/577,963

(22) PCT Filed: Nov. 4, 2004

(86) PCT No.: PCT/DE2004/002460

§ 371 (c)(1),
(2), (4) Date: May 3, 2006

(87) PCT Pub. No.: WO2005/044648

PCT Pub. Date: May 19, 2005

(65) Prior Publication Data

US 2007/0031074 A1 Feb. 8, 2007

(30) Foreign Application Priority Data

Nov. 6, 2003 (DE) .............................. 103 51 895
Feb. 5, 2004 (DE) ....................... 10 2004 005 731

(51) Int. Cl.
*F16C 33/02* (2006.01)
*F16C 17/02* (2006.01)

(52) U.S. Cl. .................. 384/295; 384/276; 384/372; 384/438

(58) Field of Classification Search ......... 384/129–130, 384/279, 438, 372–373, 295; 403/265; 264/264, 264/278–284; 15/250.27
See application file for complete search history.

(56) References Cited

U.S. PATENT DOCUMENTS

| 5,217,309 A | * | 6/1993 | Csermak et al. ............. 384/130 |
| 5,372,449 A | | 12/1994 | Bauer et al. |
| 5,634,726 A | * | 6/1997 | Edele et al. ................ 384/276 |
| 6,082,902 A | * | 7/2000 | Muehlpforte et al. ........ 384/129 |
| 6,196,754 B1 | | 3/2001 | Bruemmer et al. |
| 6,353,991 B1 | * | 3/2002 | Dehghan-Manshadi et al. .................................................... 29/516 |
| 6,491,439 B1 | * | 12/2002 | Zimmer ...................... 384/295 |
| 6,675,431 B1 | * | 1/2004 | Rachui et al. .............. 15/250.3 |
| 6,691,368 B1 | * | 2/2004 | Zimmer ................... 15/250.31 |
| 6,718,593 B2 | * | 4/2004 | Shido ....................... 15/250.31 |
| 6,883,966 B2 | * | 4/2005 | Zimmer ...................... 384/372 |
| 2003/0077012 A1 | * | 4/2003 | Zimmer ...................... 384/295 |
| 2003/0143020 A1 | * | 7/2003 | Muehlpforte et al. ........ 403/265 |

FOREIGN PATENT DOCUMENTS

| DE | 19541913 A1 | * 5/1997 |
| DE | 19546909 A1 | 6/1997 |
| DE | 199 04 155 | 8/2000 |

(Continued)

*Primary Examiner*—Marcus Charles
(74) *Attorney, Agent, or Firm*—Michael Best & Friedrich LLP

(57) ABSTRACT

The invention relates to a wiper bearing for a windshield wiper system comprising a bearing housing (12) provided with an outer tube forming the bearing housing (12) and an inner tube (24) arranged in a concentric manner in relation thereto and a journal (30) arranged on a bearing area (14) on the bearing housing (12) for receiving a tubular plate (40). It is proposed that an annular element (16), which is arranged in a coaxial manner on the journal (30), be provided outside the journal (30) in the region of the front side thereof (36).

20 Claims, 7 Drawing Sheets

FOREIGN PATENT DOCUMENTS

| | | | |
|---|---|---|---|
| DE | 199 25 292 | | 12/2000 |
| DE | 19933203 A1 | * | 1/2001 |
| DE | 102 50 843 | | 5/2004 |
| DE | 10250843 A1 | | 5/2004 |
| EP | 306361 A1 | * | 3/1989 |
| FR | 2856642 A1 | * | 12/2004 |
| JP | 2002178880 A | * | 6/2002 |
| WO | WO 9405532 A1 | * | 3/1994 |
| WO | WO 9405533 A1 | * | 3/1994 |
| WO | WO 9920498 A1 | * | 4/1999 |
| WO | WO 9943520 A2 | * | 9/1999 |
| WO | WO 0046081 A1 | * | 8/2000 |
| WO | WO 2004039644 A1 | * | 5/2004 |

* cited by examiner

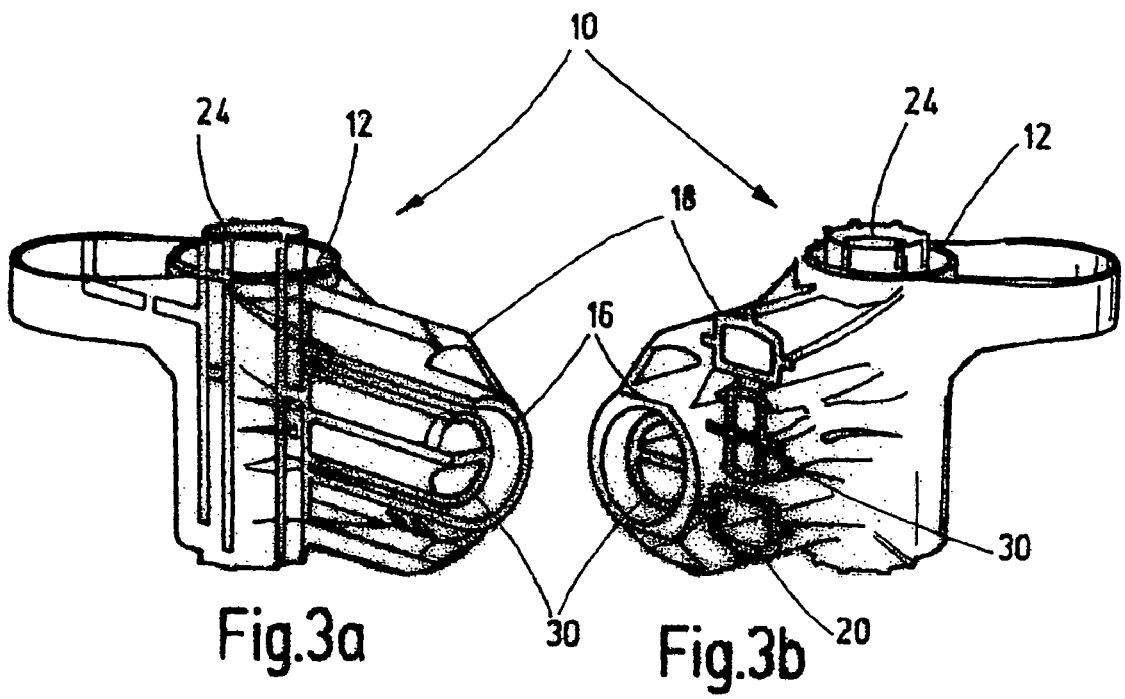
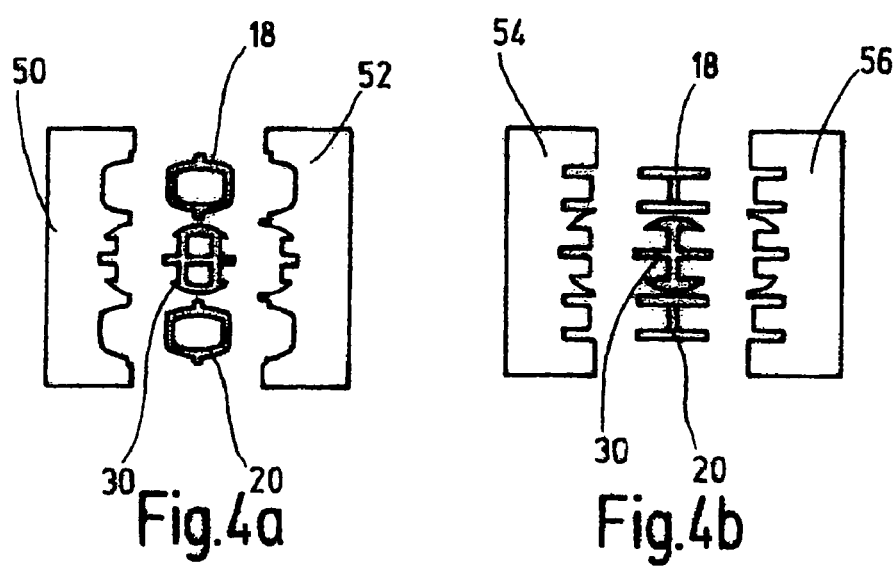

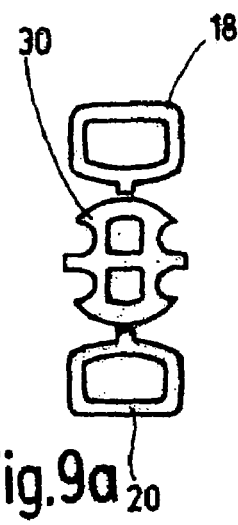
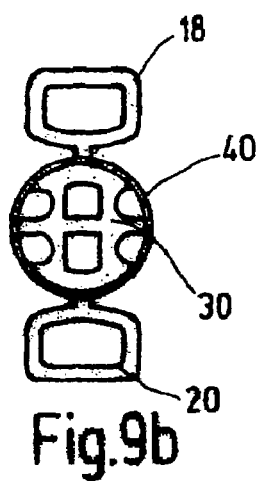
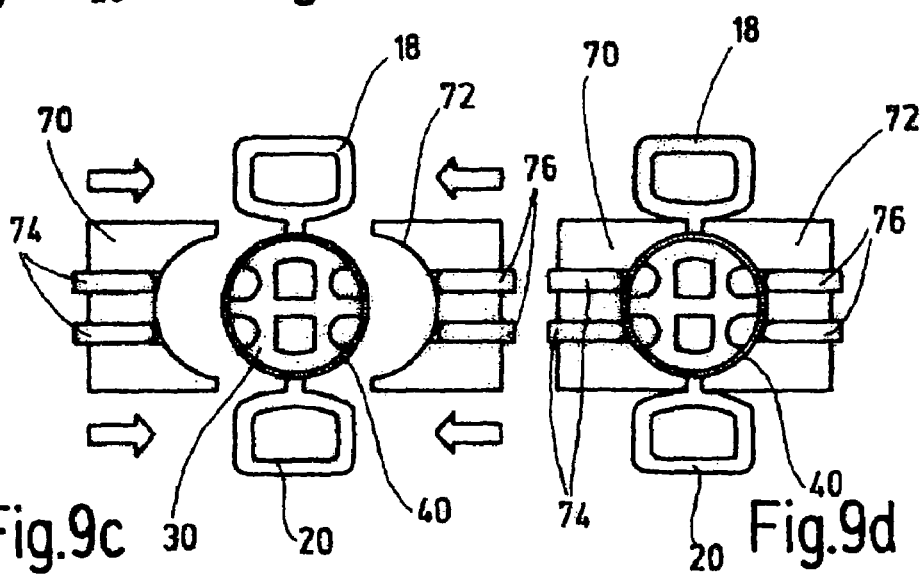
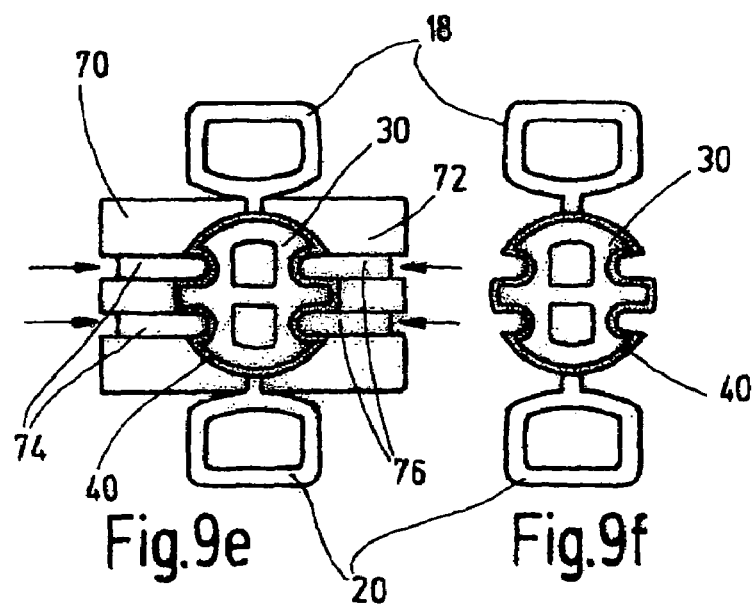

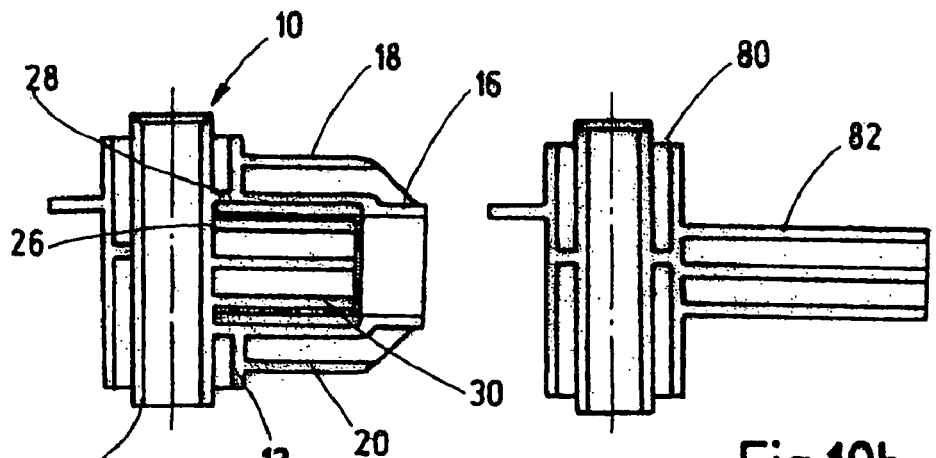
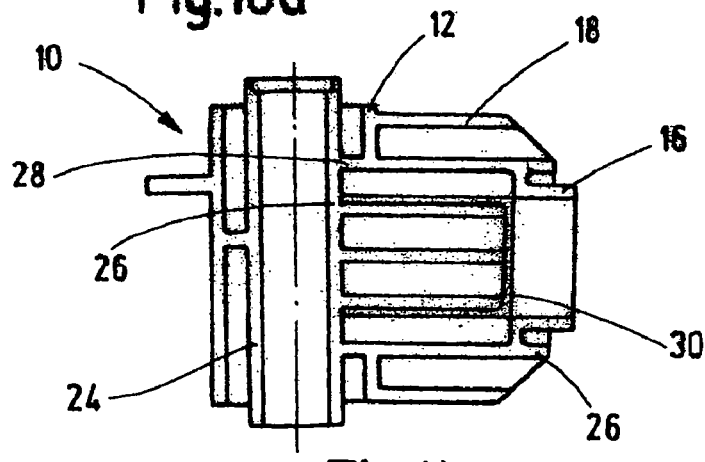
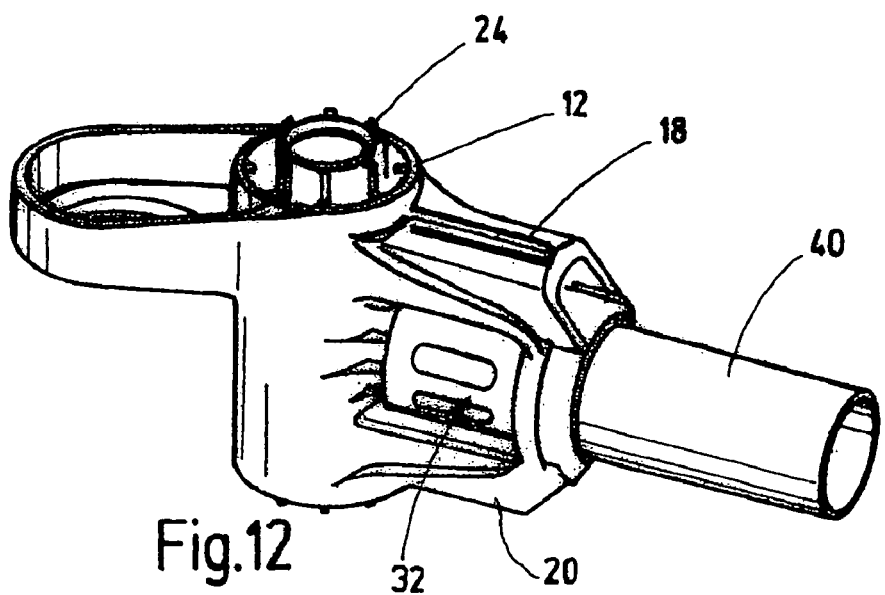

WIPER BEARING

BACKGROUND OF THE INVENTION

The invention starts with a wiper bearing.

A wiper bearing housing is used to support a wiper shaft and to position a wiper axis as well as fastening receptacles for assembly in a vehicle. High forces and moments occur above all in the transition area between the wiper bearing housing and the tubular plate, particularly in the case of snow load or cases of lock-up.

A wiper system is known from DE 199 25 292 A1 in which the tubular plate in the transition area has an enlarged cross section, which reduces the specific load in the critical transition area and increases flexural strength and resistance to torsion.

SUMMARY OF THE INVENTION

In the case of a wiper bearing in accordance with the invention, it is proposed that an annular element that is arranged in a coaxial manner on the journal be provided outside a journal that is provided to receive a tubular plate. The journal is permanently connected to a outer tube of the wiper bearing forming the bearing housing or to an inner tube arranged in a concentric manner in relation thereto. Due to a positively engaged connection of the tubular plate with the journal, forces are transferred from the bearing housing to the journal including torsional forces. The journal henceforth assumes mainly tensile forces, compressive forces and torsional forces. The annular element and its connecting braces assume bending moments and bending forces. The journal is mechanically stressed less and more uniformly as a whole. The annular element can essentially assume bending forces, which act in a plane, which is formed of a bearing axis and the journal. The tubular plate is supported by the annular element and the journal is relieved correspondingly. Only slight bending loads occur on the journal itself. It is also possible to provide two coaxially arranged annular elements. In this case, the outer annular element has very good stability and eases the connection of the tubular plate with the journal. The construction is especially compact when the journal is fastened to the inner tube. The initiation of force in this case takes place on both the inner tube as well as on the outer tube.

Because of the low stress, a transitional geometry between the journal and its bearing point on the bearing housing can be designed simply with a shortened distance between a connecting area between the journal and the tubular plate and the bearing area of the journal on the inner tube or outer tube of the bearing housing. The wiper bearing, in particular a wiper bearing made of plastic, can be designed to be shorter and more compact than previous plastic wiper bearings in which attention had to be paid to a long and harmonic transitional area in order to reduce any mechanical tension spikes occurring there. Because of the compact design of the wiper bearing, the tubular plate can be brought closer to the bearing area of the wiper axis, thereby resulting in a more rigid overall system. Because of the uniform mechanical stress of the bearing housing, it can be designed in a uniformly thin-walled manner, which is especially advantageous for a wiper bearing design of plastic in order to avoid bubbles forming in the plastic during manufacturing. In addition, a shorter cooling and cycle time during manufacturing is made possible. In connection with the reduced dead weight, the wiper bearing with the annular element can be cost-effectively manufactured and mounted. The tubular plate can be designed with a small cross section, which signifies a reduction in weight and a lower requirement for construction space. Because of elastic deformation, for example in the case of a lock-up, wiper supports with a smaller cross section of the tubular plate relieve all components of the wiper system, even the wiper lever, thereby making possible additional cost savings since these components can be designed more simply.

Because of the arrangement of the annular element and the improved support of the tubular plate in the bearing area, less movement occurs when operating the wiper system and even in the case of high loads the connecting point will not fail. The alignment of the wiper shaft remains practically unchanged so that, according to the design, the adjustment angle of the wiper blade to the vehicle window is retained, thereby guaranteeing good wiping quality.

Because of the special geometry, high component rigidity as well as an improvement in the rigidity of the overall system is achieved despite the preferred use of unreinforced plastics for the wiper bearing. As a result, the scope of use of wiper drives with plastic wiper bearings can be expanded.

The bearing housing is resistance to bending and nevertheless can be manufactured of unreinforced, cost-effective materials. During manufacturing, work can be done with very simple sliders. Because of the design of the wiper bearing and the resulting tool structure, in addition to unreinforced plastics, materials that cannot be demolded so easily are also suitable in principle, such as reinforced plastics or metallic diecasting materials, particularly Zn, Mg and Al.

The annular element is arranged connectionless to the journal on the bearing housing and can therefore keep the bending load away from the journal to a large extent. In addition the annular element is fastened with braces on the bearing housing, via which the journal is accessible from the outside at least in a connecting area, in which the tubular plate is connected to the journal. For one, the preferred fastening with upper and lower braces makes high rigidity of the annular element/brace arrangement possible, and, secondly, both manufacturing of the wiper bearing and connecting the tubular plate to the journal are simplified since the journal is accessible from outside in a simple manner for corresponding tools, for example crimping tools.

If the annular element is arranged axially in front of the journal, in particular without overlapping with the journal on its front side, the wiper bearing can be manufactured with an advantageous tool without an annular core and a correspondingly simple and solid tool slider. This also makes better tool cooling and core cooling possible with a preferred diecasting or injection molding method. If the journal projects with a front side into the annular element, demolding of hollow profile cores and of the annular core can be accomplished in the same direction, requiring only a single tool slider.

If the journal is arranged approximately centric with respect to an axial extension of the bearing housing, the annular element is supported broadly on the bearing housing and only slight component distortion occurs during cooling after manufacture, which goes hand in hand with high geometry quality and good processsability. Alternatively, the journal can be arranged off-center with respect to an axial extension of the bearing housing, e.g., on a lower end of the bearing housing. As a result, broad support on the bearing housing is possible.

The wiper bearing can be designed to be especially rigid if the journal has a cross section embodied as a hollow profile. This embodiment is especially rigid. The tool cores required for this hollow profile can be aligned in such a way that they are pulled in the direction of the journal, i.e., simultaneously with an annular tool core for generating the annular element.

Alternatively, the journal has a cross section embodied as a T-support or a double T-support.

A connecting geometry can be created and demolded in two tool halves. The tool structure is especially simple.

It is advantageous if a component geometry between the annular element and the bearing point can be demolded laterally during its manufacture. In addition to the simplifications of the tools already described, this makes it possible for the tubular plate to be surrounded after being slipped on in order to connect the tubular plate to the journal with preferred so-called crimping. This guarantees good positive engagement and a qualitatively high quality of the connection between the tubular plate and the journal. In doing so, the tubular plate is deformed plastically and displaced into pockets of the wiper bearing housing or of the journal provided for this purpose. Standard tools for crimping can be used.

BRIEF DESCRIPTION OF THE DRAWINGS

The invention will be explained in greater detail in an exemplary embodiment on the basis of the associated drawings. The drawings show:

FIGS. 3a, b A depiction of sectional planes in the longitudinal direction (a) and perpendicular to a journal line of symmetry (b);

FIGS. 4a, b A tool structure and the separation of tool halves with a cross section with a hollow profile (a) and a cross section with a T-support profile (b);

FIGS. 9a-f On the basis of a cross section through the journal, a procedural sequence of a crimping process before (a) and after attaching a tubular plate (b), introduction of the tool (c), surrounding of the tubular plate with the tool (d), insertion of the die in the connecting area between the tubular plate and the journal (e) and the completed connection (f);

FIGS. 10a, b A size comparison of a preferred wiper bearing (a) with a known wiper bearing (b);

FIG. 11 A section through a wiper bearing with an annular element executed as a double ring;

FIG. 12 A depiction of an assembly of wiper bearing and tubular plate;

DETAILED DESCRIPTION

The invention is particularly suitable for wiper bearings made of plastic. In general, the same reference numbers are used in the figures for the same parts.

Figure 1:
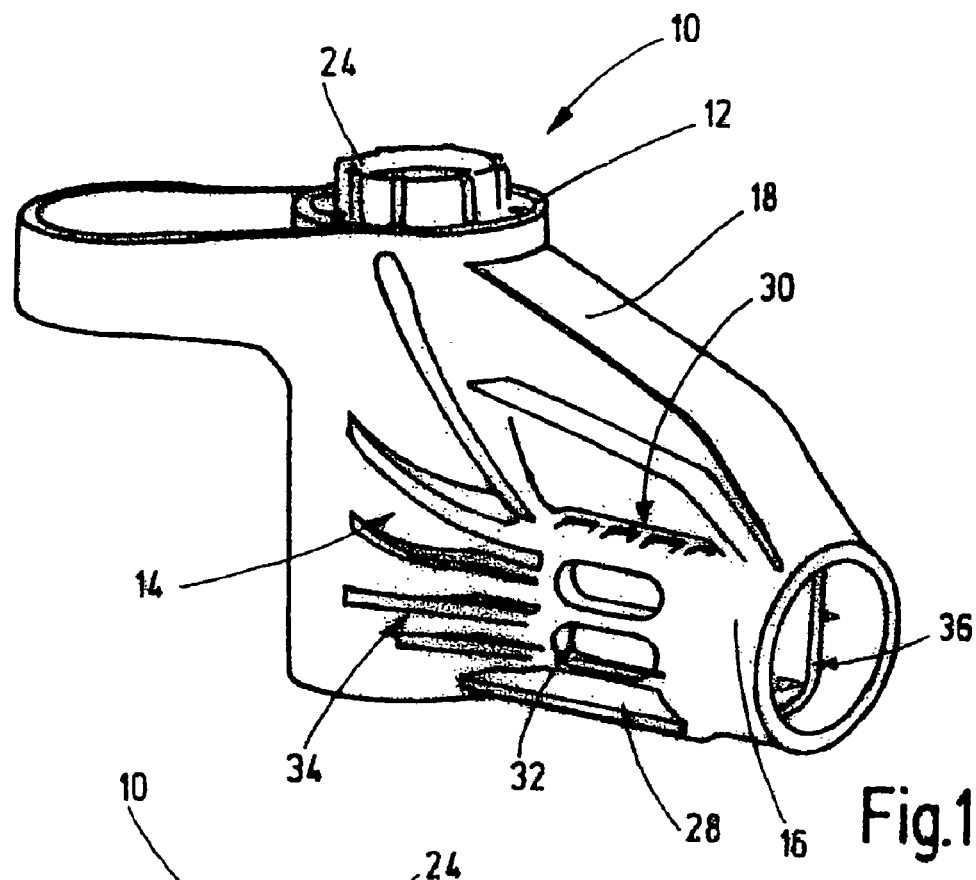
FIG. 1 A wiper bearing with a short annular element with asymmetrical fastening via support profiles.

FIG. 1 shows a wiper bearing 10 for a windshield wiper system with a bearing housing 12 and a journal 30 arranged on a bearing area 14 on a bearing housing 12 and a short annular element 16. The bearing housing 12 formed by an outer tube concentrically surrounds an inner tube 24. The short annular element 16 is arranged coaxially outside the journal 30 in the area of its front side 36. The journal 30 and the annular element 16 are arranged off-center with respect to an axial extension of the bearing housing 12.

The annular element 16 is fastened on the bearing housing 12 with an upper brace 18 and a lower brace 20, through which the journal 30 is accessible from the outside at least in a connecting area 32. A tubular plate (not shown) will subsequently be connected to the journal 30 in this connecting area 32. The braces 18, 20 are embodied in this case as T-supports. The annular element 16 has no direct connection to the journal 30 so that the tubular plate (not shown) can be slipped on the journal 30 in a small free space between the journal 30 and the inner circumference of the annular element 16. The free space is dimensioned in such a way that the tubular plate can be adjacent to both the journal 30 as well as the inner circumference of the annular element 16.

Figure 2:
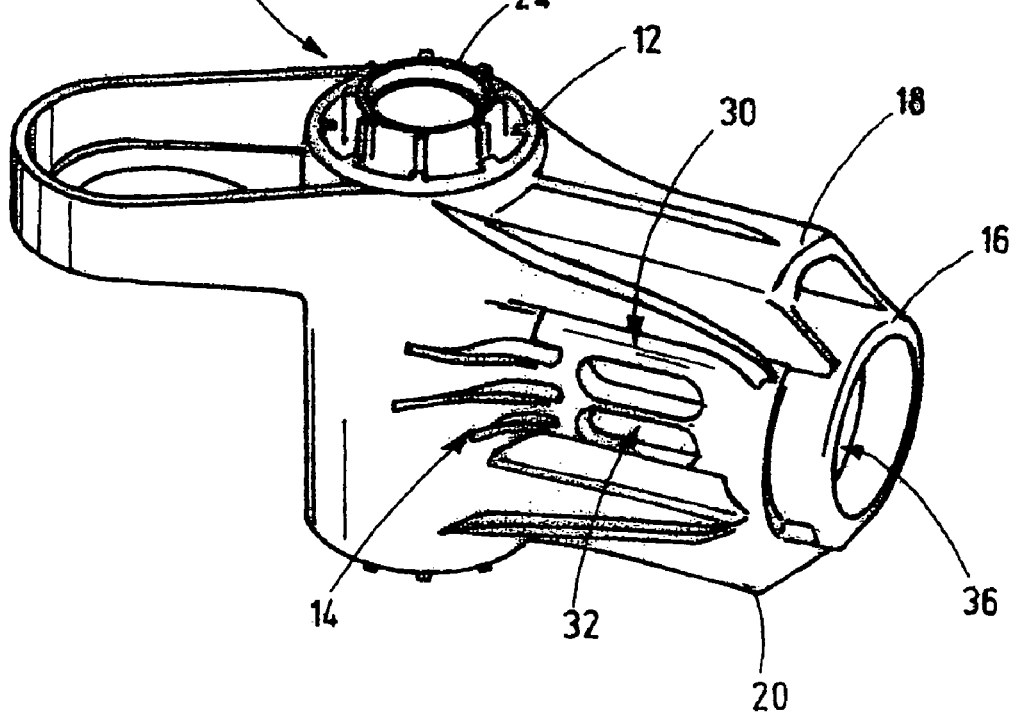
FIG. 2 A wiper bearing with a short annular element with symmetrical fastening with a hollow profile cross section.

FIG. 2 shows a wiper bearing 10 with a short annular element 16 with a symmetrical connection of the journal 30 and the annular element 16 on the bearing housing 12. The lower and upper braces 18, 20, which hold the annular element 16, have a hollow profile cross section. The journal 30 and the annular element 16 are arranged approximately centric with respect to an axial extension of the bearing housing 12.

FIGS. 3a, b depict a representation of sectional planes through the wiper bearing 10. FIG. 3a shows a section in the longitudinal direction of the journal 30. It is evident that the journal 30 is connectionless to the annular element 16. FIG. 3b shows a section perpendicular to a journal line of symmetry. The journal 30 has a hollow profile, which has a reinforcing element arranged centrically; the lower and upper braces 18, 20, which hold the annular element 16, are also embodied as hollow profiles.

FIGS. 4a, b show a cross section of a preferred tool for manufacturing braces 18, 20 and the journal 30 as well as the separation of tool halves 50, 52 of the tool. The arrangement of the braces 18, 20 and of the journal 30 in accordance with the invention advantageously permits the use of a tool, which can be divided in the center into the two tool halves 50, 52. FIG. 4a shows the tool with braces 18, 20 embodied as hollow profiles and a journal 30 embodied as a hollow profile. FIG. 4b shows a variation of the tool for braces 18, 20 embodied as a T-profile and the journal 30.

Figure 5A:
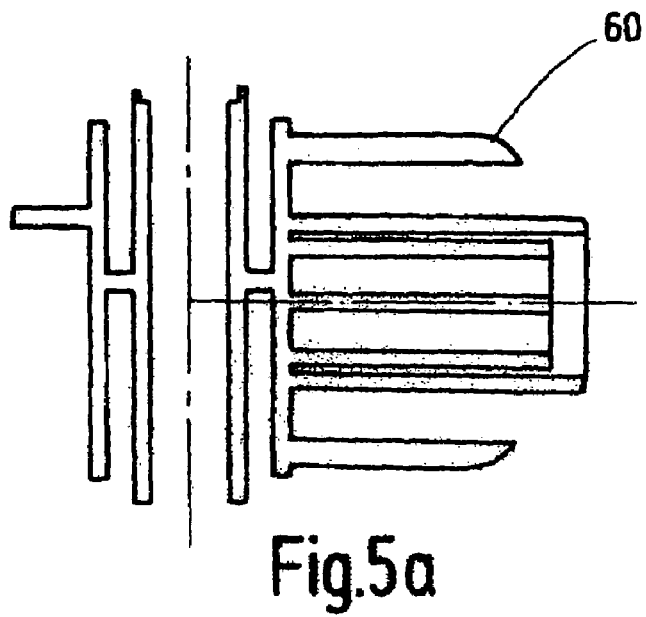
FIGS. 5a, b A tool structure (a) and a tool core with an annular core (b)
Figure 5B:
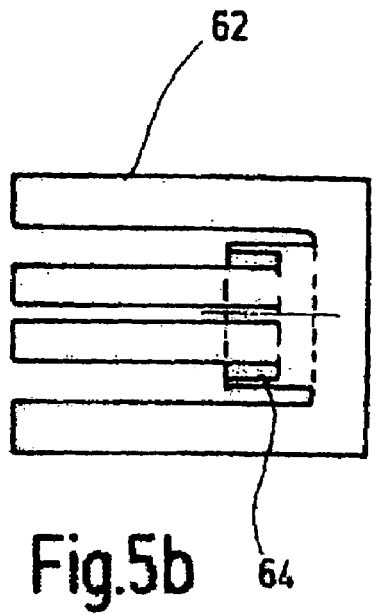
Figure 6:
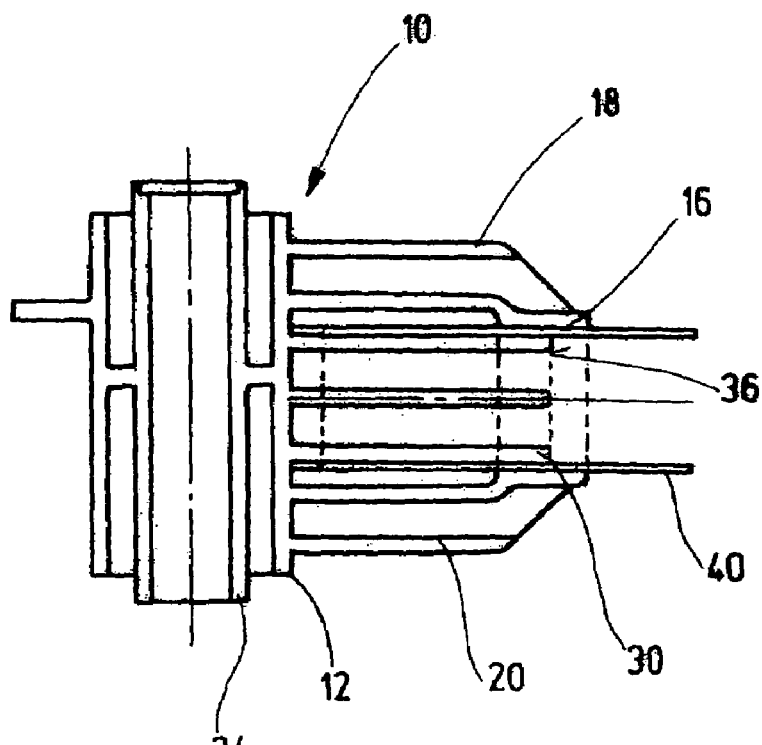
FIG. 6 A cross section through a wiper bearing with overlapping of the journal and annular element.

FIGS. 5a, b show as longitudinal section through a preferred tool structure of a tool 60 (FIG. 5a) and an associated preferred tool slider 62 (FIG. 5b) for an embodiment of the journal 30 and braces 18, 20 with hollow profiles. In order to demold the four hollow profile cores, as shown in FIG. 4a for example, only a single tool slider 62 is advantageously required, whereby the annular core 64 and the hollow profile cores can be demolded in this same direction. The annular core 64 is required if the journal 30 and annular element 16 overlap, i.e., the front side 36 of the journal 30 projects into the annular element 16. FIG. 6 shows a section through this type of wiper bearing 10 with overlapping of the journal 30 and the annular element 16 with a tubular plate 40 slid on. The tubular plate 40 is stably clamped between the annular element 16 and journal 30 in the overlapping area.

Figure 7A:
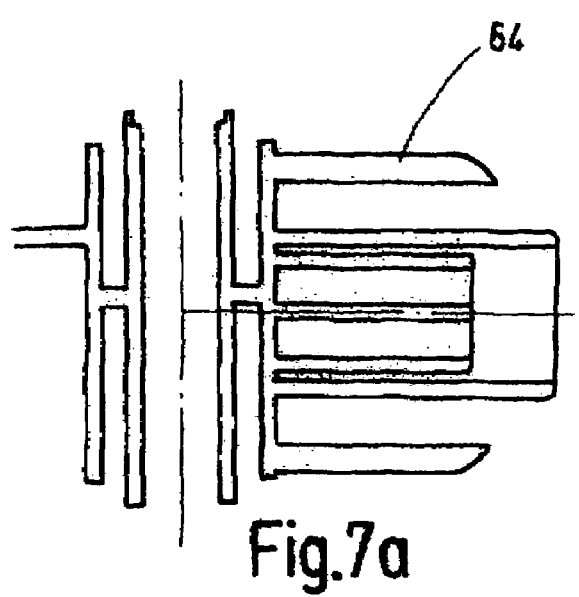
FIGS. 7a, b A tool structure (a) and a tool core without an annular core (b)
Figure 7B:
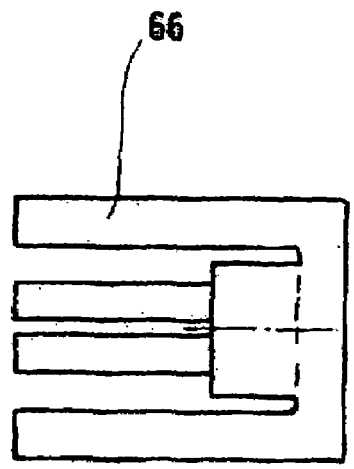
Figure 8:
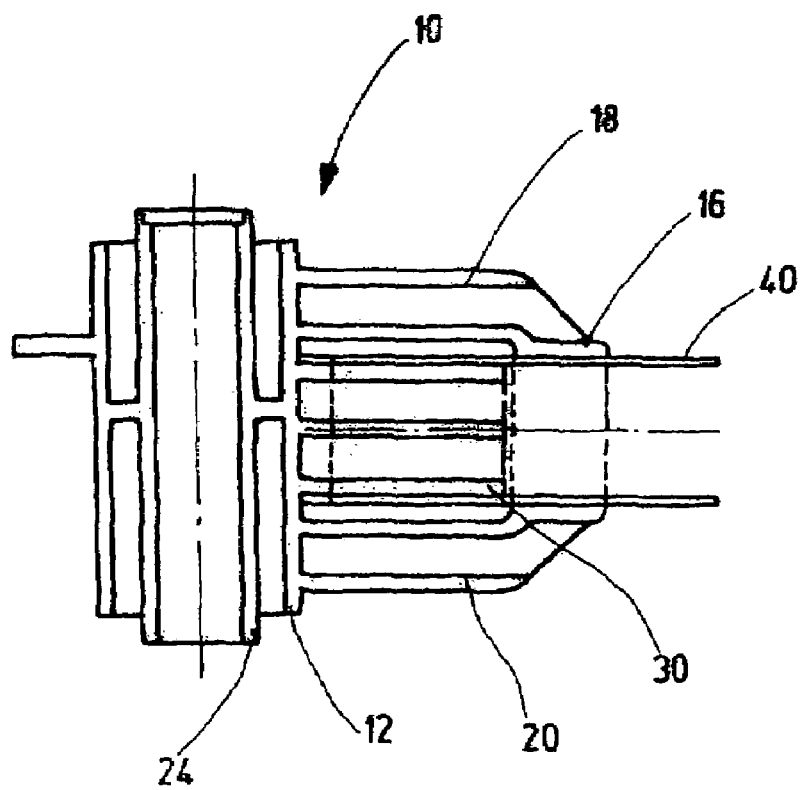
FIG. 8 A cross section through a wiper bearing without overlapping of the journal and annular element.

FIGS. 7a, b depict a tool structure without an annular core. The tool structure of the tool 70 shows a mold for a shorter journal 30 than in FIG. 5a (FIG. 7a) and a tool core without an annular core (FIG. 7b). A solid tool slider structure is possible as a result; moreover the tool and the tool core can be cooled better. The variation of this type of wiper bearing 10 is depicted in FIG. 8 as a cross section. A tubular plate 40 is slid onto a journal 30 and is simultaneously encircled by an annular element 16. The journal 30 is shorter than in the exemplary embodiment in FIG. 6 and does not project into the annular element 16, which sits axially in front of the journal 30.

FIGS. 9a-f illustrate on the basis of cross sections through the journal 30 and the braces 18, 20 a procedural sequence of a connecting process between the journal 30 and the tubular plate 40 that is executed as a crimping process. FIG. 9a shows the journal 30 and braces 18, 20 at the beginning of connection. FIG. 9b also shows the tubular plate 40 that is slid onto the journal 30. Finally, on both sides of the journal 30, a tool part 70, 72 with die pairs 74, 76 each approaches the journal 30 (FIG. 9c) until the journal 30 that is surrounded by the tubular plate 40 is surrounded by the tool parts 70, 72 (FIG. 9d). This is possible because of the special wiper bearing geometry and very advantageous for the quality of the connection between the journal 30 and the tubular plate 40. Finally, the die pairs 74, 76 for creating a positive engagement between the wiper bearing or the journal 30 and the tubular plate 40 are pressed into the tubular plate 40. The die pairs 74, 76 displace the tubular material into pockets on the journal 30 provided for this purpose (FIG. 9e). FIG. 9f shows the finished arrangement upon conclusion of the connecting process. The tubular plate 40 is connected with positive engagement to the journal 30 in the connecting area (corresponding to connecting area 32 in FIG. 1 and FIG. 2).

FIGS. 10a, b depict a size comparison of a preferred wiper bearing 10 (FIG. 10a) with a known wiper bearing 80 (FIG. 10b). The preferred wiper bearing 10 has a journal 30, which is fastened on an inner tube 24 of the wiper bearing 10 so that an initiation of force occurs both on the inner tube 24 as well as on the bearing housing 12 embodied as the outer tube. The bearing area 26 of the journal 30 and the bearing area 28 of the annular element 16 or of the elements on the inner tube 24 holding the annular element 16 are preferably embodied concentrically in order to guarantee good roundness of the two bearing areas 26, 28. On the other hand, the known wiper bearing 80 shows a journal 82 that must be considerably longer than is the case with the arrangement in accordance with the invention with correspondingly lower flexural strength and tension excesses under load.

FIG. 11 shows a section through a wiper bearing 10, in which the annular element 16 is embodied as a double ring. The double ring increases the stability of the annular element 16. In addition, this creates a greater free space between the journal 30 and the braces 18, 20 so that when connecting the tubular plate 40 to the journal 30 there is more space for a tool, particularly a crimping tool.

FIG. 12 shows a depiction of an assembly of wiper bearing 10 and tubular plate 40. The tubular plate 40 is connected with positive engagement to the journal 30 in the connecting area 32. Braces 18, 20 hold an annular element 16, which encircles the tubular plate 40. The braces 18, 20 are embodied as hollow profiles.

Figure 13:
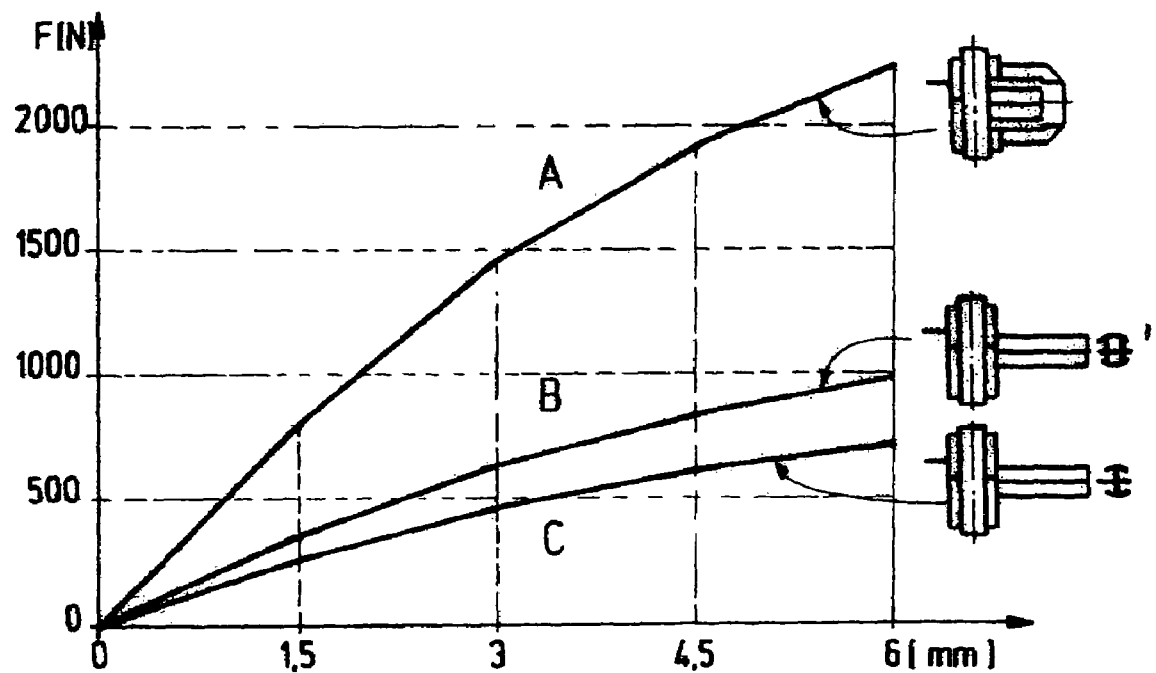
FIG. 13 A comparison of component rigidities of a preferred wiper bearing in accordance with the invention and two known wiper bearings with a hollow profile journal and a T-support journal.

The embodiment in accordance with the invention of a wiper bearing 10 provides a clear improvement in component rigidity. FIG. 13 shows a comparison of component rigidities of a preferred wiper bearing 10 and two known wiper bearings with a hollow profile journal and a T-support journal similar to the design in FIG. 10b.

The known wiper bearing with the T-support journal has the lowest component rigidity, which is clearly evident in Curve C. Even though a known wiper bearing with a hollow profile journal shows an improvement in the component rigidity (Curve B), the wiper bearing 10 in accordance with the invention is improved in terms of its component rigidity by more than a factor of 2. This is due to the fact that the distribution of the elastic tension in this case is very uniformly distributed on the journal, while in the case of the known wiper bearings local tension excesses occur as analyses using the finite element method (FEM) have shown.

REFERENCE NUMBERS

10 Wiper bearing
12 Bearing housing
14 Bearing area
16 Annular element
18 Brace
20 Brace
24 Inner ring
26 Bearing area
28 Bearing area
30 Journal
32 Connecting area
34 Brace
36 Front side
40 Tubular plate
50 Tool part
52 Tool part
54 Tool part
56 Tool part
60 Tool
62 Tool core
64 Tool
66 Tool core
70 Tool part
72 Tool part
74 Die pair
76 Die pair

The invention claimed is:

1. Wiper bearing for a windshield wiper system comprising a bearing housing (12) provided with an outer tube forming the bearing housing (12) and an inner tube (24) arranged and connected in a concentric manner in relation thereto, the inner tube (24) extending through the bearing housing (12) and for mounting a bearing shaft, and a journal (30) arranged on a bearing area (14) on the bearing housing (12) for receiving a tubular plate (40) characterized in that an annular element (16), which is arranged in a coaxial manner on the journal (30), is provided outside the journal (30) in the region of the front side thereof (36).

2. Wiper bearing according to claim 1, characterized in that a free space is formed between the journal (30) and an inner circumference of the annular element (16).

3. Wiper bearing according to claim 2, characterized in that the annular element (16) is arranged axially in front of the journal (30).

4. Wiper bearing according to claim 1, characterized in that the annular element (16) is fastened with braces (18, 20) on the bearing housing (12), via which the journal (30) is accessible from the outside at least in a connecting area (32) through a side wall of the bearing area (14).

5. Wiper bearing according to claim 1, characterized in that the annular element (16) is arranged axially in front of the journal (30).

6. Wiper bearing according to claim 5, characterized in that the journal (30) projects with the front side (36) into the annular element (16).

7. Wiper bearing according to claim 6, characterized in that the journal (30) is arranged approximately centric with respect to an axial extension of the bearing housing (12).

8. Wiper bearing according to claim 6, characterized in that the journal (30) is arranged off-center with respect to an axial extension of the bearing housing (12).

9. Wiper bearing according to claim 1, characterized in that the journal (30) is arranged approximately centric with respect to an axial extension of the bearing housing (12).

10. Wiper bearing according to claim 1, characterized in that the journal (30) is arranged off-center with respect to an axial extension of the bearing housing (12).

11. Wiper bearing according to claim 10, characterized in that the journal (30) is fastened to the inner tube (24).

12. Wiper bearing according to claim 1, characterized in that the journal (30) is fastened to the inner tube (24).

13. Wiper bearing according to claim 12, characterized in that the journal (30) has a cross section embodied as a hollow profile.

14. Wiper bearing according to claim 1, characterized in that the journal (30) has a cross section embodied as a hollow profile.

15. Wiper bearing according to claim 14, characterized in that a component geometry between the annular element (16) and the bearing area (14) can be demolded laterally during its manufacture.

16. Wiper bearing according to claim 1, characterized in that the journal (30) has a cross section embodied as a double T-support including a first T-support portion and a second inverted T-support portion.

17. Wiper bearing according to claim 1, characterized in that a component geometry between the annular element (16) and the bearing area (14) can be demolded laterally during its manufacture.

18. Wiper bearing according to claim 1, characterized in that the inner tube (24) protrudes from the bearing housing (12).

19. Wiper bearing according to claim 1, characterized in that the journal (30) is connected at one end to the bearing housing (12) and has an opposite end, in that the annular element (16) is fastened with braces (18, 20) to the bearing housing (12), in that free space is provided between the journal (30) and the annular element (16) and between the journal (30) and the braces (18, 20) substantially from the one end of the journal (30) to the opposite end of the journal (30), and in that a tubular plate (40) is insertable into the free space to extend along the journal (30) from the opposite end and proximate the bearing housing (12).

20. Wiper bearing for a windshield wiper system comprising a bearing housing (12) provided with an outer tube forming the bearing housing (12) and an inner tube (24) arranged in a concentric manner in relation thereto and a journal (30) arranged on a bearing area (14) on the bearing housing (12) for receiving a tubular plate (40) characterized in that an annular element (16), which is arranged in a coaxial manner on the journal (30), is provided outside the journal (30) in the region of the front side thereof (36), that a free space is formed between the journal (30) and an inner circumference of the annular element (16), and that the annular element (16) is fastened with braces (18, 20) on the bearing housing (12), via which the journal (30) is accessible from the outside at least in a connecting area (32).

\* \* \* \* \*

UNITED STATES PATENT AND TRADEMARK OFFICE
CERTIFICATE OF CORRECTION

PATENT NO. : 7,581,887 B2  Page 1 of 1
APPLICATION NO. : 10/577963
DATED : September 1, 2009
INVENTOR(S) : Joachim Zimmer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 339 days.

Signed and Sealed this

Fourteenth Day of September, 2010

David J. Kappos
*Director of the United States Patent and Trademark Office*